(No Model.) 3 Sheets—Sheet 1.

T. A. COOK & F. LABELLE.
MATCH MACHINE.

No. 345,485. Patented July 13, 1886.

Attest:
Sidney P. Hollingsworth
Wm. H. Shipley

Inventors:
T. A. Cook
Felix Labelle
By P. T. Dodge, Atty.

(No Model.) 3 Sheets—Sheet 2.

T. A. COOK & F. LABELLE.
MATCH MACHINE.

No. 345,485. Patented July 13, 1886.

on line x-x

Attest
Sidney P. Hollingsworth
Wm H. Shipley

Inventors.
T. A. Cook
Felix Labelle
By P. T. Dodge
Atty (No Model.) 3 Sheets—Sheet 3.
T. A. COOK & F. LABELLE.
MATCH MACHINE.
No. 345,485. Patented July 13, 1886.
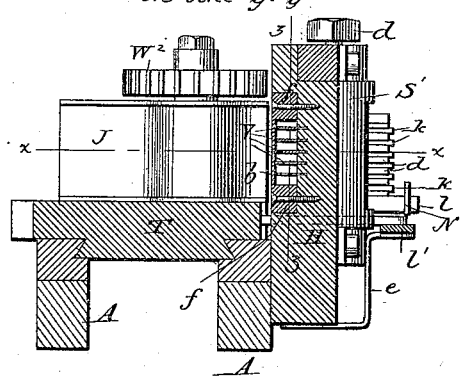
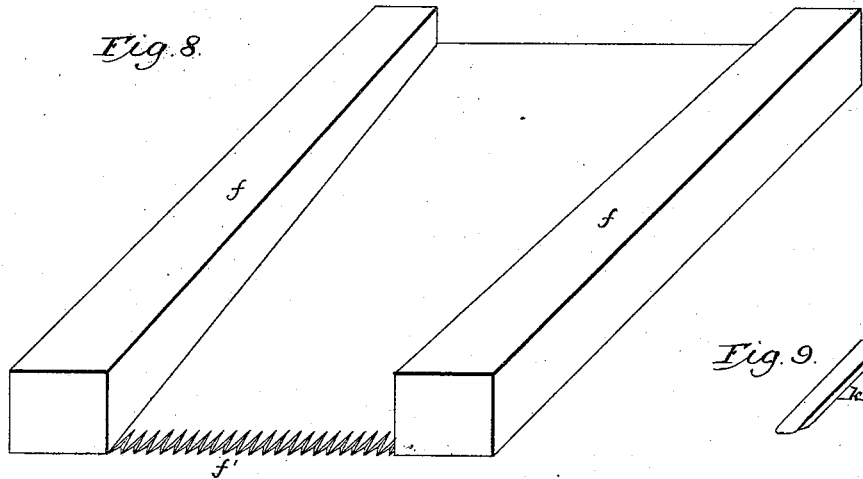
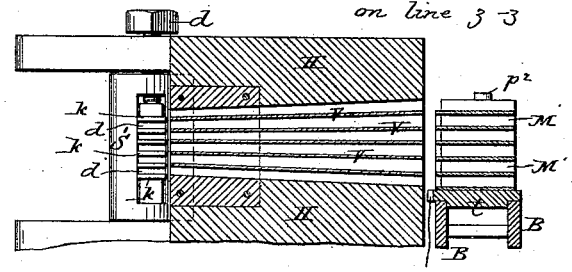
Attest
Sidney P. Hollingsworth
Wm H. Shipley
Inventors.
T. A. Cook
Felix Labelle
By P. T. Dodge Atty

UNITED STATES PATENT OFFICE.

THOMAS AUSTIN COOK, OF OTTAWA, ONTARIO, AND FELIX LABELLE, OF HULL, QUEBEC, CANADA; SAID LABELLE ASSIGNOR OF HIS RIGHT, BY DIRECT AND MESNE ASSIGNMENTS, TO SAID COOK AND JOSEPH COURSOLLE, OF OTTAWA, AND JAMES HENRY KERR, OF HULL, CANADA.

MATCH-MACHINE.

SPECIFICATION forming part of Letters Patent No. 345,485, dated July 13, 1886.

Application filed March 15, 1886. Serial No. 195,222. (No model.) Patented in Canada August 15, 1884, No. 19,966.

*To all whom it may concern:*

Be it known that we, THOMAS AUSTIN COOK, of the city of Ottawa, in the Province of Ontario, and FELIX LABELLE, of the city of Hull, in the Province of Quebec, Dominion of Canada, have invented certain Improvements in Match-Machines, (patented in Canada August 15, 1884, No. 19,966,) of which the following is a specification.

Our invention relates to machines for slicing and racking matches or cutting the match-splints from the block and placing them single in convenient racks handy for further manipulation, and has special reference to the cutters or knives employed in such machines and to the mechanism connected therewith, and also the head-stock on which the cutting operation is performed and the feeding and racking arrangements.

Figure 1:
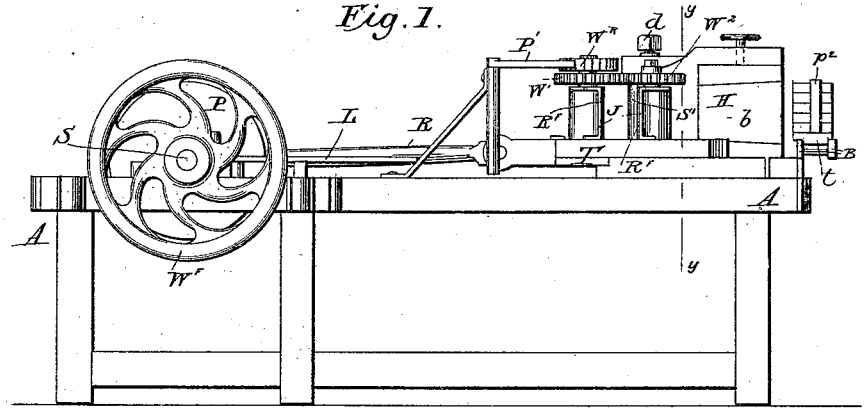
Figure 2:
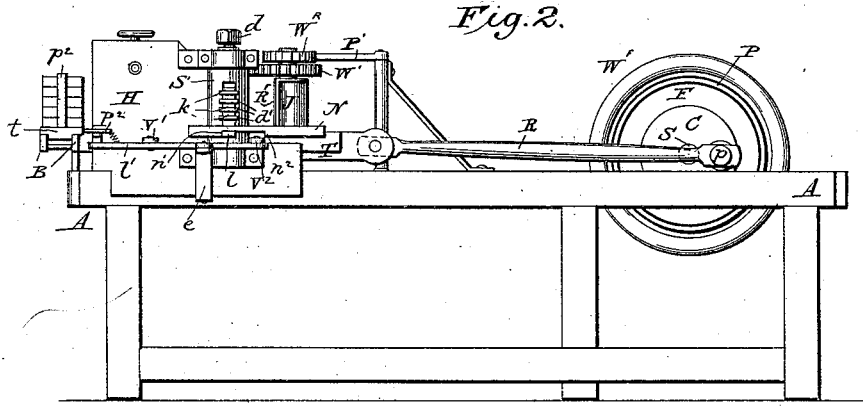
Figure 3:
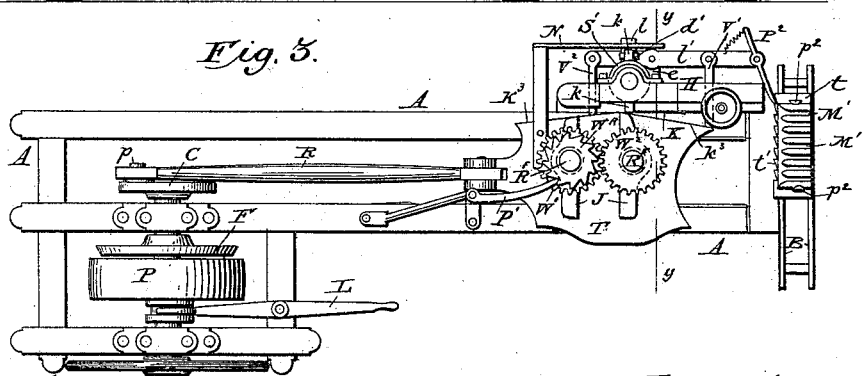
Figure 4:
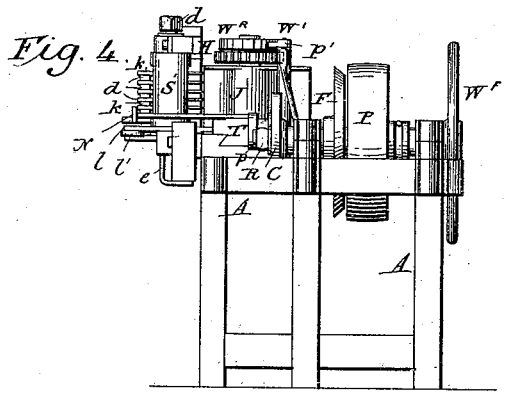
Figure 5:
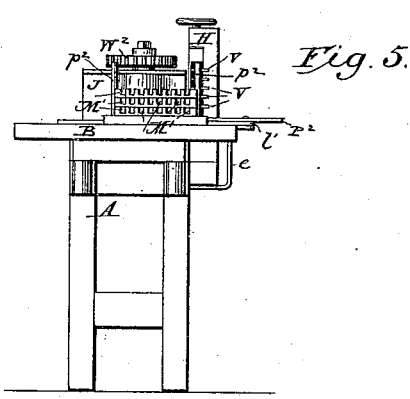
Figure 6:
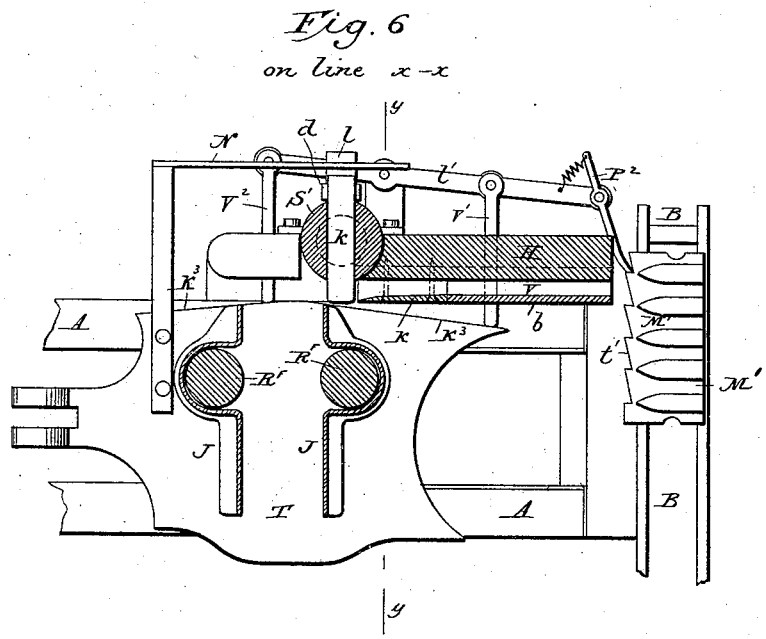

Referring to the accompanying drawings, Figure 1 is a front elevation of a slicer with our improvements. Fig. 2 is a back elevation of the same. Fig. 3 is a plan of the same. Figs. 4 and 5 are end elevations of the head-stock and table. Fig. 6 is a horizontal section through the head-stock, on an enlarged scale, on line $x\ x$ of Fig. 7. Fig. 7 is a vertical section through the head-stock, on an enlarged scale, on line $y\ y$, Figs. 1, 3, and 10. Fig. 8 is a view of our improved cutting-knife. Fig. 9 is a perspective view of one of the splinting-knives. Fig. 10 is a longitudinal vertical section through the delivery-channels.

A is the bed or frame of the machine, upon which is mounted, at one end, a cross-shaft, S, driven by a belt upon a pulley, P, geared into a friction-clutch, F, and carrying a fly-wheel, $W^f$, at one end and a crank-disk, C, at the other, to which latter the connecting-rod or pitman R is journaled upon a suitable crank-pin, $p$.

L is a starting and stopping lever.

At the end of the machine is mounted the head-stock H and necessary mechanism.

The connecting-rod R gives a reciprocating movement to the cutting-table T, suitably mounted upon a bed, and having a pair of jaws, J, secured upon it, in each of which a vertical feed-roller, $R^F$, is journaled, projecting slightly beyond the face of the jaw, and which are connected by a pair of spur-wheels, $W'\ W^3$, at the top, receiving motion by means of a ratchet-wheel, $W^R$, mounted upon one of the rollers, coming into contact with a stationary pawl, P', at each return-stroke of the table.

The block from which the matches or splints for the same are to be cut is held in the jaws J, between the feed-rollers $R^F$, and after each forward stroke, when a slice has been severed from the block, it is fed forward sufficiently to present material for the next cut, the thickness being determined by the pitch of the ratchet-wheel $W^R$, and the length of the pawl P', and suitable to the section of the splints.

H is the head-stock, to which the cutter or knife K is firmly secured, the flat side of the latter facing the table and block. The part of the face of the head-stock over which the cutter is placed, and extending all along the head-stock to the delivery end, is fitted with little shelves V, forming a series of tapering channels, having a width of mouth exactly corresponding to the section of each match or splint, but diverging toward the other end sufficiently to correspond with the rack, into which the splints as cut are received. These channels are parallel in plane, and where not covered with the cutter K are closed by the plate $b$.

In front of the shoulders V, and in line with their ends, is a series of incising or splinting knives, $k$, mounted and secured by a set-screw, $d$, in a vertical slot in the cutter-head S', which latter is sustained by vertical pivots or journals, so that it may receive a limited rocking or rotary reciprocating motion to throw the points of the knives $k$ into or out of an operative position. These knives are very thin, and by means of distance-pieces $d'$ they are set the required distance apart, being the thickness of the matches required, the cutting-edges of these knives projecting beyond the cutting-edge of the cutter K into the block a distance also corresponding to the thickness of the slice or width of the splints or matches, which are generally square in section. Thus while the cutters K sever from the block a vertical slice the knives $k$ have previously made a series of longitudinal incisions, separating the slice into strips or separate splints or matches, and as the block moves along each splint or match enters its own channel as formed by the shelves V, and remains there until the next stroke produces a new series, entering the same channel and pushing forward the series cut, and depositing them into the rack placed at the rear end for their reception. The cutter-head or knife-holder S' carries a lever, $l$, working in notch $n'$ $n^2$ on the arm N, which is secured to and moves with the table T. Toward the end of the cutting-stroke the forward shoulder, $n'$, forming the said notch, strikes the lever $l$ and turns the spindle, thus moving the knives $k$ toward the front and out of contact with the block. The return-stroke of the table, and with it the arm N, swivels the cutter-head S', with the knives $k$, back to their position ready for cutting by means of the shoulder $n^2$ striking the lever $l$ and moving it in the opposite direction.

At the rear end of the machine the slide-bars B are secured, upon which works the rack-table $t$, consisting of a plate provided with grooves or rabbets to fit and slide upon the bars B, and also with a series of ratchet-teeth, $t'$, and a pin or guide-post, $p^2$, at each end, between which are placed the cross-grooved trays forming the rack M, when filled, one upon another, the cross-grooves M' forming channels for the reception of the splints or matches. This rack-table is fed forward after each cut by means of the spring-lever pawl $P^2$ gearing into the ratchet-teeth $t'$, the pawl $P^2$ being pivoted upon and receiving a transverse motion from the lever $l'$, pivoted to the bracket $e$, and bearing, by means of the feeder-rods $V'$ $V^2$, on incline planes or cams $K^3$, formed on the forward and rearward end of the slide of the table T, thus imparting to the pawl $P^2$ a transverse motion sufficient to move the rack-table the required distance, so calculated as always to bring a vertical row of channels into the rack opposite the discharging ends of the channels formed by the shelves V. When the rack is full, it is removed and wedged in a frame, thus holding the match-splints ready for tipping, and its place on the rack-table being supplied by a new set of trays.

We are aware that slicers of a somewhat similar construction are not new, but hitherto the cutter or knife used for the same have been of a very frail nature, very difficult to make, very expensive to produce, and very unsatisfactory in their wear. These knives consisted of bars, having a cutting-edge formed, resembling in cross-section the letter I, with the stem joined to the bar.

Our improved cutter is formed as shown in Fig. 8, having a thin tapering plate with ridges or flanges $f$ at the sides, so that each side forms a parallelogram, the cutting-edges being finely serrated, and the pitch of the serration $f'$ corresponding to the thickness of the splints.

The ridges or flanges $f$ may be made separate, and secured to the plate by screws or bolts; or the whole knife or cutter may be formed out of one solid piece of steel, as may be deemed most convenient. This cutter merely severs the slice from the block. The slice, however, having been previously incised by the fine knives $k$, separates into splints or strips as soon as severed from the block. These knives $k$ consist merely of steel bars having their ends ground down to plain blades, and are much more easily and cheaply produced, and possess more strength, and consequently wear much better. The mechanism connected with these knives, cutters, and other motions also differ more or less from any others, to the best of our knowledge.

Having thus described our invention, what we claim is—

1. In a match-splint machine, the slicing knife or cutter K, consisting of a thin plate, $f'$, having a serrated cutting-edge provided with flanges or ribs $f$, extending lengthwise of its edges and projecting above its side face, as described, whereby the splint is permitted to pass over the face of the knife between said flanges.

2. In a match-splint machine, the combination of the fixed slicing-knife, the rotary head mounted in fixed bearings and provided with a series of slicing-knives, $k$, the reciprocating slide adapted to carry the wooden blank, and mechanism, substantially as described, for imparting an oscillatory motion to the knife-supporting head from the slide.

3. In a match-splint machine, the combination of the pivoted holder S', provided with splitting-knives, the reciprocating slide adapted to carry the wooden blank, and the shouldered arm N, attached to said slide and acting to turn the holder S', as described.

4. In combination with the knives for producing splints, the reciprocating carrier T, provided with inclined surfaces $k$, the sliding carriage to receive the racks, the pawl to move said carriage, and the pawl-actuating lever having arms or projections actuated by the inclined surfaces, substantially as described and shown.

5. The combination of the cutter K, knives $k$, and head S' with the reciprocating table T, head-stock H, provided with the delivery-channels of increasing width toward the delivery end, and the arm N, connected with and operated by the head T.

6. In a match-machine, the series of splint-producing knives V, arranged as described and shown, in diverging lines, whereby the intermediate delivery-channels are given an increasing area in the direction of the delivery.

Ottawa, Ontario, February 26, 1886.

THOMAS AUSTIN COOK.
FELIX LABELLE.

In presence of—
A. P. THERICAULT,
J. A. VALIN.